US012725264B2

(12) United States Patent
Keskikangas et al.

(10) Patent No.: US 12,725,264 B2
(45) Date of Patent: Sep. 1, 2026

(54) MASKING A DETECTED OBJECT IN A VIDEO STREAM

(71) Applicant: Axis AB, Lund (SE)

(72) Inventors: Axel Keskikangas, Lund (SE); Song Yuan, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 257 days.

(21) Appl. No.: 18/613,890

(22) Filed: Mar. 22, 2024

(65) Prior Publication Data

US 2024/0331161 A1 Oct. 3, 2024

(30) Foreign Application Priority Data

Mar. 30, 2023 (EP) .................................... 23165574

(51) Int. Cl.
*G06T 7/11* (2017.01)
*G06T 7/136* (2017.01)
*G06T 7/194* (2017.01)

(52) U.S. Cl.
CPC ................ *G06T 7/11* (2017.01); *G06T 7/136* (2017.01); *G06T 7/194* (2017.01); *G06T 2207/10016* (2013.01)

(58) Field of Classification Search
None
See application file for complete search history.

(56) References Cited

U.S. PATENT DOCUMENTS

2005/0123172 A1* 6/2005 Henson ............ G08B 13/19686 382/103
2006/0126738 A1* 6/2006 Boice ..................... H04N 7/181 348/E7.086
2015/0213702 A1* 7/2015 Kimmel ................. G06V 20/52 382/103
2015/0248590 A1* 9/2015 Li ........................ G06V 10/267 382/103
2016/0086052 A1* 3/2016 Piekniewski ........... G06T 7/292 382/103
2022/0392353 A1* 12/2022 Contreras .............. G01C 21/00
2023/0086993 A1* 3/2023 Danielsson ............. G06T 7/136 382/173

OTHER PUBLICATIONS

Extended European Search Report issued on Sep. 22, 2023 for European Patent Application No. 23165574.7.

* cited by examiner

*Primary Examiner* — Soo Shin
(74) *Attorney, Agent, or Firm* — Volpe Koenig

(57) ABSTRACT

A device and a method mask an object in a video stream. The camera is arranged in a system including the camera and another device. A location and field of view is known for the device and the camera. Furthermore, the field of view of the device and the camera are non-overlapping. Information indicating that an object is approaching the field of view of the camera is obtained. The obtained information is determined from the device indicating a location and a direction of movement of the object and the known locations and fields of view of the camera and the device. In response to the information, a threshold for detecting objects to be masked in the video stream captured by the camera is reduced. An object to be masked in the video stream is detected using the reduced threshold, and masking of the object in the video stream is inserted.

12 Claims, 2 Drawing Sheets

MASKING A DETECTED OBJECT IN A VIDEO STREAM

FIELD OF INVENTION

The present disclosure relates to masking of objects in a video stream captured by a camera, and specifically to masking of an object when the object first enters the field of view of the camera.

TECHNICAL BACKGROUND

Although video monitoring of a particular scene may improve overall security, it may be desirable to keep certain objects in the scene from being identifiable by e.g., a person watching the recorded video footage from a camera, such as a monitoring camera, capturing the scene. For example, for reasons of privacy, it may be desirable that an identity of a person, or e.g., details of a license plate of a vehicle, captured by the camera should not be directly derivable from just watching the recorded video footage. Such protection of certain objects may be achieved by masking the objects in the video stream before outputting the video stream to e.g., a display or storage device. Such masking may include e.g., covering an object with a solid color, blurring the object, pixelating the object, or even making the object more or less transparent, within each image of the output video stream.

Before being able to insert masking of a particular object, the location of the object within an image must first be estimated. This may be achieved by using an object detection algorithm which has been trained/configured to detect e.g., objects of a certain class (such as faces, persons, license plates, etc.) within an image. Once a location of an object has been detected, the masking can then be applied to the object.

However, it is important that an object is masked in all images of a video stream, even when the circumstances are such that detecting of the object is difficult. The object detection algorithm may for example fail to properly detect the object when the object first enters the field of view of the camera since then first only a portion of the object is located in the field of view of the camera. This may cause a failure of masking the object.

SUMMARY

To at least partially solve the above identified problem of unreliable masking of an object when the object first enters a field of view of a camera, the present disclosure provides an improved method of masking a detected object in a video stream captured by the camera is provided, a corresponding camera, and a non-transitory computer-readable storage medium as defined in the accompanying independent claims.

According to a first aspect, a method for masking a detected object in a video stream captured by a camera is provided. The camera is arranged in a camera system including the camera and at least a further device. A location and field of view is known for the further device and a location and a field of view is known for the camera and the field of view of the further device and the field of view of the camera are non-overlapping. In the camera, information is obtained indicating that an object is approaching the field of view of the camera. The obtained information is determined from information from the further device indicating a location and a direction of movement of the object and the known locations and fields of view of the camera and the further device. In response to the obtained information a threshold for detecting objects that are to be masked in the video stream captured by the camera is reduced. An object that is to be masked in the video stream is then detected using the reduced threshold, and masking of the detected object is inserted in the video stream.

Since the location and field of view of the further device and the location and field of view of the camera are known, information can be received in the camera indicating that the object is approaching the field of view of the camera based on information from the further device indicating a location and a direction of movement of the object. By using the received information to reduce a threshold for detecting objects that are to be masked in the video stream captured by the camera, the probability that the object is detected already when the object first enters the field of view of the camera is increased.

The further device may for example be a sensor.

The threshold may be a threshold for what is detected as foreground and what is detected as background. By this the probability that the object is detected already when the object first enters the field of view of the camera is increased for scenarios where detection of the object is based on detection of foreground.

The threshold may specify a confidence over which an object is determined to belong to an object class which is to be masked in the video stream. By this the probability that the object is detected already when the object first enters the field of view of the camera is increased for scenarios where detection of the object is based on determining a confidence that the object belongs to an object class which is to be masked in the video stream.

The obtained information may further indicate a subarea of the field of view of the camera in which the object is expected to first appear. In the act of reducing, the threshold is then reduced only in the indicated subarea. By this the probability that the object is detected already when the object first enters the field of view of the camera is increased whilst the risk of false detections of objects in other areas than subarea is reduced.

The obtained information may further indicate at which point in time the object will first appear in the field of view of the camera. By knowing a time when the object is estimated to appear in the field of view of the camera, a better timing of the lowering of the threshold. Thus, the risk of false detections of objects before the object enters the field of view of the camera is reduced.

The obtained information from the further device may further indicate that the object is masked by the further device.

The obtained information from the further device may further indicate an object class of the object.

The obtained information from the further device may further indicate a confidence in relation to the object class.

In the act of reducing, the threshold may be reduced in an area along a periphery of the field of view. By this the probability that the object is detected already when the object first enters the field of view of the camera is increased whilst the risk of false detections of objects in other areas than the periphery of the field of view is reduced.

The further device may be one of a further camera, an IR camera, a thermal camera, a radar, a sonar, and a lidar.

The method may further comprise increasing the threshold after detecting the object is detected in the camera field of view. On condition that the object is then detected using the increased threshold, masking of the detected object in the video stream is maintained. On condition that the object is not detected using the increased threshold, masking of the detected object in the video stream is discontinued. This enables reduction of the risk of false detections of objects at times after objects have entered the field of view of the camera completely.

The act of increasing the threshold may be performed a predetermined time after detecting the object. This enables reduction of the risk of false detections of objects at times after objects have entered the field of view of the camera completely.

According to a second aspect, a non-transitory computer-readable storage medium is provided having stored thereon instructions for implementing the method according to the first aspect, when executed in a camera having at least a processor.

According to a third aspect, a camera for masking a detected object in a video stream captured by the camera is provided. The camera comprises circuitry configured to execute, when the camera is arranged in a camera system including the camera and at least a further device, wherein a location and field of view is known for the further device and a location and a field of view is known for the camera, and wherein the field of view of the further device and the field of view of the camera are non-overlapping, an obtaining function, a reducing function, a detecting function, and an inserting function. The obtaining function is configured to obtain information indicating that an object is approaching the field of view of the camera, wherein the obtained information is determined from information from the further device indicating a location and a direction of movement of the object and the known locations and fields of view of the further device and the camera. The reducing function is configured to, in response to the obtained information, reduce a threshold for detecting objects that are to be masked in the video stream captured by the camera. The detecting function is configured to detect an object that is to be masked in the video stream using the reduced threshold, and the inserting function is configured to insert masking of the detected moving object in the video stream.

The above-mentioned optional additional features of the method according to the first aspect, when applicable, apply to the camera according to the third aspect as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting but are instead used for explaining and understanding.

DETAILED DESCRIPTION

The present disclosure will now be described hereinafter with reference to the accompanying drawings, in which currently preferred embodiments of the disclosure are illustrated. This disclosure may, however, be embodied in many different forms and should not be construed as limited to the embodiments set forth herein.

Figure 1:
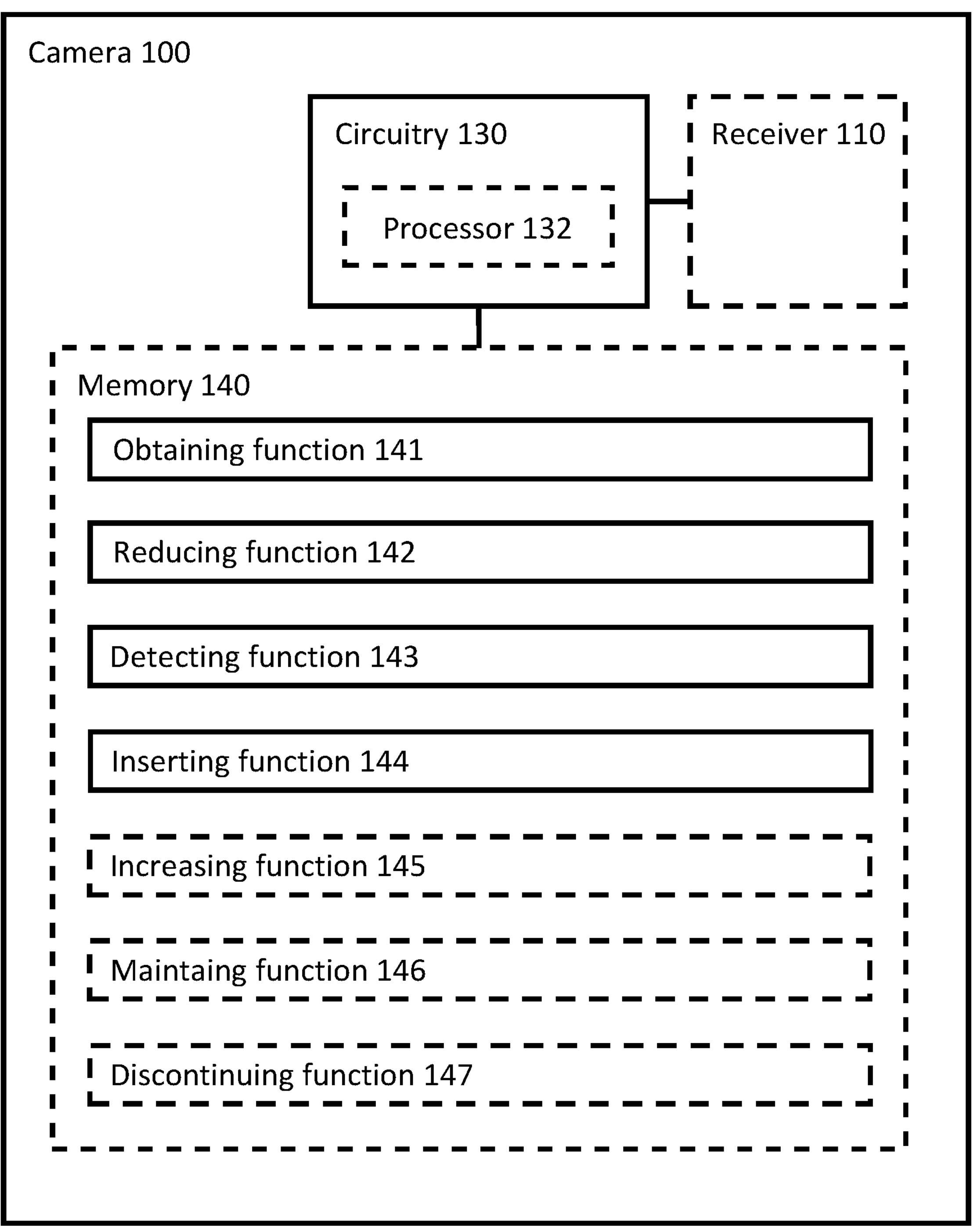
FIG. 1 shows a schematic diagram in relation to embodiments of a camera for masking a detected object in a video stream captured by the camera.

FIG. 1 shows a schematic block diagram of embodiments of a camera 100 for masking a detected object in a video stream captured by the camera 100. The camera 100 may be any type of camera, such as a monitoring camera, a security camera or a surveillance camera, which may be arranged in a camera system including the camera 100 and at least a further device, wherein a location and a field of view is known for the camera 100 and a location and field of view is known for said further device. Said further device may for example be a further camera. The camera 100 captures a sequence of image frames, e.g., in the form of a video, wherein each image frame depicts a scene defined by the field of view of the camera 100.

The camera 100 comprises a circuitry 130 and may comprise a receiver 110. The camera 100 will typically also comprise an encoder (not shown), an image sensor (not shown), and an image processor (not shown).

The circuitry 130 is configured to carry out functions of the camera 100. The circuitry 130 may include a processor 132, such as a central processing unit (CPU), microcontroller, or microprocessor. The processor 132 is configured to execute program code. The program code may for example be configured to carry out the functions of the camera 100.

The camera 100 may further comprise a memory 140. The memory 140 may be one or more of a buffer, a flash memory, a hard drive, a removable media, a volatile memory, a non-volatile memory, a random access memory (RAM), or another suitable device. In a typical arrangement, the memory 140 may include a non-volatile memory for long term data storage and a volatile memory that functions as system memory for the circuitry 130. The memory 140 may exchange data with the circuitry 130 over a data bus. Accompanying control lines and an address bus between the memory 140 and the circuitry 130 also may be present.

The functions of the camera 100 may be embodied in the form of executable logic routines (e.g., lines of code, software programs, etc.) that are stored on a non-transitory computer readable medium (e.g., the memory 140) of the camera 100 and are executed by the circuitry 130 (e.g., using the processor 132). Furthermore, the functions of the camera 100 may be a stand-alone software application or form a part of a software application that carries out additional tasks related to the camera 100. The described functions may be considered a method that a processing unit, e.g., the processor 132 of the circuitry 130, is configured to carry out. Also, while the described functions may be implemented in software, such functionality may as well be carried out via dedicated hardware or firmware, or some combination of hardware, firmware and/or software.

The circuitry 130 of the camera 100 is configured to execute an obtaining function 141, a reducing function 142, a detecting function 143, and an inserting function.

The obtaining function 141 is configured to obtain information indicating that an object is approaching the field of view of the camera, wherein the obtained information is determined from information from the further device indicating a location and a direction of movement of the object and the known locations and fields of view of the further device and the camera. The obtained information may be received in the receiver 110.

The reducing function 142 is configured to, in response to the obtained information, reduce a threshold for detecting objects that are to be masked in the video stream captured by the camera;

The detecting function 143 is configured to detect an object that is to be masked in the video stream using the reduced threshold.

The inserting function 144 is configured to insert masking of the detected moving object in the video stream.

Masking as envisaged herein may e.g., be a solid/opaque color, be semi-transparent, include applying a motion blur to an object such that the object can no longer easily be identified, and/or e.g., a forced pixelation and/or obfuscation of an object in the output image stream such that the object can no longer easily be identified, or similar. In other envisaged embodiments, masking may include making the objects themselves at least partially transparent in the output image stream, such that the background is visible through the objects. This may be possible if e.g., an image of the background without the object(s) in front is available (from e.g., an earlier time-instance).

Herein, detection may be implemented using e.g., one or more commonly available algorithms for object detection as already available within the various fields of computer technology, such as e.g., computer vision and/or image processing. Such algorithms may include both non-neural network and neural network approaches. A minimal requirement is however that the algorithm (or combinations of algorithms) being used are able to determine, at least in ideal conditions, whether a particular object (such as a face, body, license plate, etc.) that is supposed to be masked is present in an image. Whether the used algorithms are e.g., feature-based, template-based and/or motion-based is not important as long as the above requirements are met. A detector may for example be implemented using one or more neural network specifically trained for that purpose. For the purpose of the present disclosure, it is also assumed that such algorithms used may struggle to properly detect objects which when they first enter the field of view of the camera 100 since it then is then first only partially in the field of view of the camera 100.

The camera 100 is configured to be arranged in a camera system including the camera 100 and at least a further device. Specifically, the camera system including the camera 100 and the further device should be arranged and configured such that the location and field of view of the further device and the location and field of view of the camera 100 are known, and such that information indicating a location and a direction of movement of the object can be provided from the further device. Information indicating that the object is approaching the field of view of the camera 100 to be received in the camera 100 may then either be prepared in a centralized solution using a central server or in a distributed solution using the further device and camera 100. In the centralized solution, only the central server needs to know the location and field of view of the further device and the location and field of view of the camera 100. After receiving information from the further device indicating location and direction of movement of the object, the central server may then prepare the information indicating that the object is approaching the field of view of the camera 100 and provide this information to the camera 100. In the distributed solution, the further device may send the information indicating location and direction of movement of the object directly to the camera 100 and the camera 100 may then, being aware of its own location and field of view, determine whether the object is approaching the field of view of the camera 100, and when it is, trigger one or more of the three actions. In the latter case, the information indicating that the object is approaching the field of view of the camera 100 would be the information indicating a location and a direction of movement of the object received from the further device.

To determine the location and direction of movement of an object would typically require the further device to provide at least 2-dimensional representations over time. Hence, the further device may be one of, but not limited to, a further camera, an IR camera, a thermal camera, a radar, a lidar, and sonar. In such scenarios, in a centralized solution, the further device may determine a relative location and relative direction of movement in relation to its location and field of view by detection of the object over a sequence of image frames. The centralized server could then, knowing the absolute or relative location and field of view of both the further device and the camera 100, determine whether the object is approaching the field of view of the camera 100, and when it is, provide such information to the camera 100. In a distributed solution, the knowledge of the location and field of view of the further device and camera 100 in relation to a common coordinate system may be located in the further device and the camera 100, respectively. In alternative, each of the further device and the camera 100 may be aware of its relative location in relation to the other. The location and direction of movement of the object may then be determined in the further device by detection of the object over a sequence of image frames and information indicating the location and direction of movement of the object may be provided to the camera 100. The camera 100 may then, being aware of its own location and field of view, determine whether the object is approaching the field of view of the camera 100, and when it is, trigger one or more of the three actions. In the latter case, the information indicating that the object is approaching the field of view of the camera 100 would be the information indicating a location and a direction of movement of the object received from the further device. From the detections of the object over a sequence of image frames of the further device, an estimated time when the object will enter the field of view of the camera 100 can be determined. Furthermore, from the location and direction of movement, the subarea of the field of view of the camera 100 in which the object will appear can be determined.

Generally, it is not essential how the location and field of view of the further device and the location and field of view of the camera 100 is determined as long as it is determined and then known either centrally or distributed such that the camera 100 can receive information indicating that the object is approaching its field of view, wherein the information is based on information from the further device indicating the location and direction of movement of the object and the location and field of view of the further device and the location and field of view of the camera 100. For example, the location and field of view of the further device and the location and field of view of the camera 100 may be determined at set up of the camera system, e.g., using gps and/or location and direction of mounting based on a map or entered manually into a system connected to the camera system. In alternative the location and field of view of the further device and the location and field of view of the camera 100 may be determined using a self-learning system which receives information of detection and movement of objects in the further device and the camera and over time determines the location and field of view of the further device and the location and field of view of the second device and/or whether or not an object having a particular location and direction of movement according to the further device is approaching the field of view of the camera 100.

The optional additional features of the method 200 described in relation to FIG. 2 in the following, when applicable, apply also to the camera 100 described in relation to FIG. 1.

Figure 2:
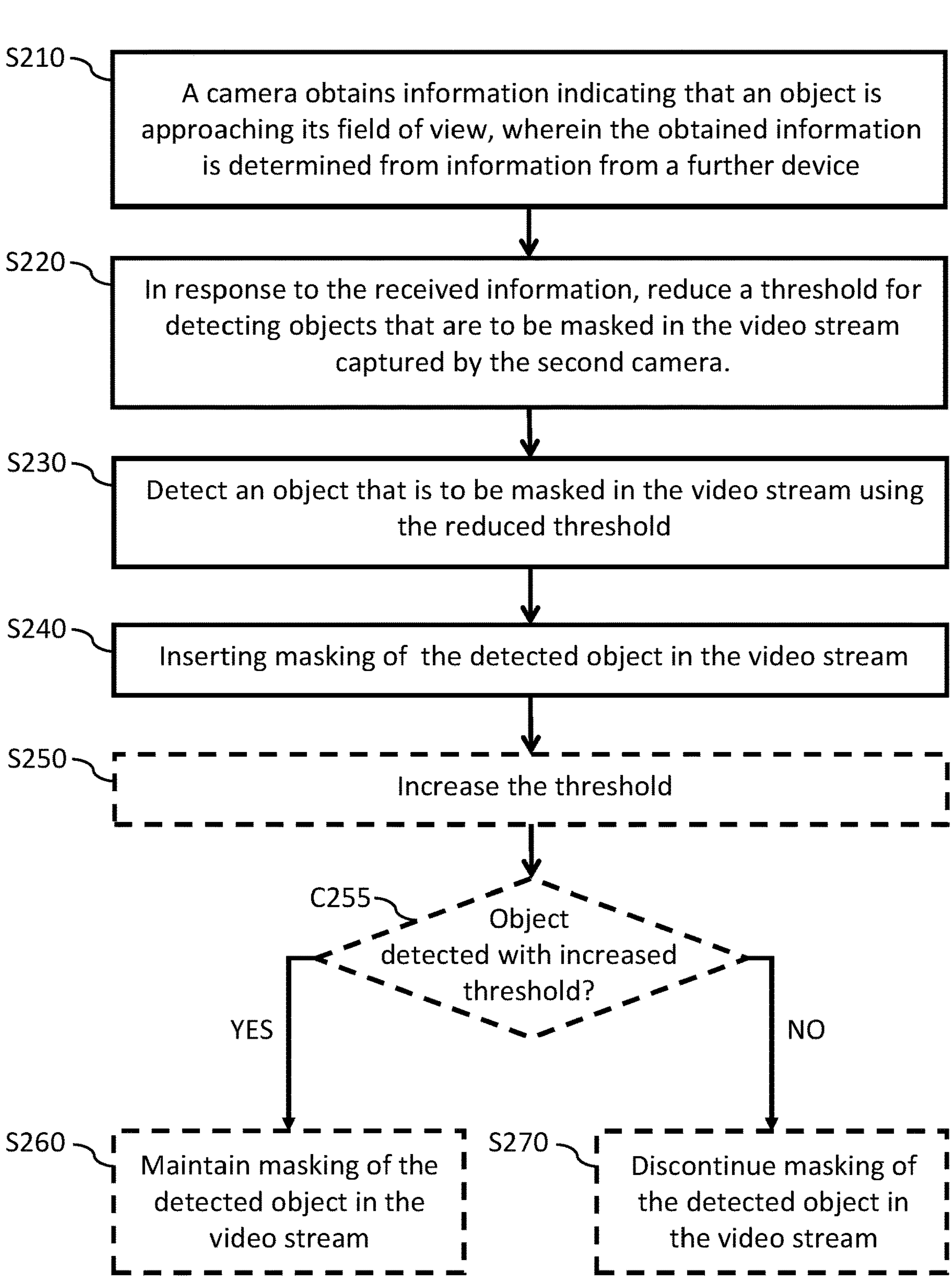
FIG. 2 shows a flow chart in relation to embodiments of a method for masking a detected object in a video stream captured by a camera.

FIG. 2 shows a flow chart in relation to embodiments of a method 200 for masking a detected object in a video stream captured by a camera. The camera is arranged in a camera system including the camera and at least a further device as described in more detail in relation to FIG. 1. A location and a field of view is known for the further device and a location and a field of view is known for the camera. The method 200 comprises obtaining S210, in the camera, information indicating that an object is approaching the field of view of the camera, wherein the obtained information is determined from information from the further device indicating a location and a direction of movement of the object and the known locations and fields of view of the camera and the further device. This is described in more detail in relation to FIG. 1. The method 200 further comprises, in response to the obtained information, reducing S220 a threshold for detecting objects that are to be masked in the video stream captured by the camera, detecting S230 an object that is to be masked in the video stream using the reduced threshold, and inserting S240 masking of the detected object in the video stream.

By using information from the further device indicating a location and a direction of movement of the object and the known locations and fields of view of the camera and the further device to obtain information indicating that an object is approaching the field of view of the camera, it will be known in the camera that the object is about to appear in its field of view before it actually does so. Furthermore, only a portion of the object will typically be visible in one or more images of the video stream captured by the camera when the object first appears in the field of view of the camera. Depending on type of detection used, the object may not be detected until all or at least a substantial part of the object is within the field of view of the camera. Hence, in order to increase the probability that the object is detected also when only a portion of the object is within the field of view of the camera when the object first appears in the field of view, the sensitivity of the detection is increased based on the obtained information. Specifically, this is done by reducing S220 the threshold for detecting objects that are to be masked in the video stream captured by the camera.

As lowering the threshold for detecting objects that are to be masked in the video stream captured by the camera will increase the sensitivity in all areas of the field of view of the camera, the obtained information may further indicate a subarea of the field of view of the camera in which the object is expected to first appear. The threshold is then reduced S220 only in the indicated subarea. In all other areas of the field of view of the camera the threshold is not reduced. This will increase the sensitivity of the detection only in the subarea of the image where the object is expected to first appear and hence reduce the risk of false detection and masking of objects in other areas of the field of view. Additionally, or alternatively, the threshold may instead be reduced S220 in an area along a periphery of the field of view. This will achieve a similar effect since an object approaching the field of view of the camera will first appear somewhere along the periphery.

The information that the object is approaching the field of view of the camera is obtained S210 in the camera before the object appears in the field of view of the camera.

The obtained information may further indicate at which point in time the object will occur in the field of view of the camera. The threshold is then reduced S220 starting from the indicated point in time. This will increase the sensitivity of the detection starting from the indicated point in time and hence reduce the risk of false detection and masking of objects before the indicated point in time.

The obtained information from the further device, e.g., a further camera, may further indicate that the object is masked by the further device. The indication that the object is masked by the further device may increase the probability that the object should be masked by the camera and, hence, the threshold for detecting objects to be masked may be reduced further.

The obtained information from the further device camera may further indicate an object class of the object. The camera may then use this information to determine if the object should be masked also by the camera. If not the act of reducing S220 may be overridden.

The obtained information from the further device camera may further indicate a confidence in relation to the object class. If the indication, by the further device, is of a high confidence for the object class, and the class is one that should be masked in the camera, the threshold for detecting objects to be masked may be reduced further for that object class.

In embodiments the threshold may be a threshold for what is detected as foreground and what is detected as background. For example, a background model may define, for each spatial area of a plurality of spatial areas in image frames of the video stream, whether that spatial area belongs to a background or a foreground in the video sequence. A spatial area may be determined to belong to the background on condition that no significant change has occurred in image data of the spatial area of an image frame relative to image data of the spatial area of a preceding image frame in the video stream before a predetermined time limit and be determined to belong to the foreground otherwise. Reducing the threshold for what is detected as foreground and what is detected as background may then be to reduce the amount of change that is considered to be a significant change or increasing the time limit there should be no significant change occurring for a spatial area being considered to belong to the background.

In other embodiments, the threshold specifies a confidence over which an object is determined to belong to an object class which is to be masked in the video stream. The threshold is then reduced S220 such that the confidence level required for an object to be determined to belong to an object class which is to be masked is reduced. For example, if all faces should be masked, the threshold for identifying a face is lowered, e.g., from 80% to 30% such that masking is performed for objects that are faces at a probability of 30%.

The method may further comprise increasing S250 the threshold again after detecting S230 the object using the reduced threshold. On condition that the object is detected using the increased threshold, masking of the detected object in the video stream is then maintained S260. On condition that the object is not detected using the increased threshold, masking of the detected object in the video stream is then discontinued S270. For example, the threshold may be increased S250 a predetermined time after detecting S230 the object. The predetermined time may be selected such that it is likely that the entire object is in the field of view of the camera.

The above-mentioned optional additional features of the camera 100 described in relation to FIG. 1, when applicable, apply also to the method 200 described in relation to FIG. 2.

In an alternative a method for masking a detected object in a video stream captured by a camera is provided similar to the method 200 described hereinabove in relation to FIG. 2. The camera is arranged in a camera system including the camera and at least a further device similar to the camera system described in relation to FIG. 1. A location and a field of view is known for the further device and a location and a field of view is known for the camera. A difference in this alternative method is that there are some features of the camera system that makes it sufficient that an object is detected by the further device to determine that that the object is approaching the field of view of the camera. This may for example be since the camera and the further device are arranged in a specific way in relation to each other. For example, the further device may be arranged in a corridor or along a road such that it has a field of view covering a portion of the corridor or road which is before a portion that is covered by the field of view of the camera such that an object that is moving along the road or the corridor and is detected by the further device is approaching the field of view of the camera and is likely to enter the field of view of the camera within a period of time dependent on the distance between the further device and the camera and the velocity of the object detected. The alternative method comprises obtaining S210, in the camera, information indicating that an object is approaching the field of view of the camera, wherein the obtained information is determined from information from the further device indicating that the object is detected and the knowledge that the object being detected by the further device indicates that the object is approaching the field of view of the camera. The alternative method further comprises, in response to the obtained information, reducing a threshold for detecting objects that are to be masked in the video stream captured by the camera, detecting S230 an object that is to be masked in the video stream using the reduced threshold, and inserting S240 masking of the detected object in the video stream.

By using information from the further device indicating a detection of the object and the knowledge that the object being detected by the further device indicates that the object is approaching the field of view of the camera, it will be known in the camera that the object is about to appear in its field of view before it actually does so. Furthermore, only a portion of the object will typically be visible in one or more images of the video stream captured by the camera when the object first appears in the field of view of the camera. Depending on type of detection used, the object may not be detected until all or at least a substantial part of the object is within the field of view of the camera. Hence, in order to increase the probability that the object is detected also when only a portion of the object is within the field of view of the camera when the object first appears in the field of view, the sensitivity of the detection is increased based on the obtained information. Specifically, this is done by reducing the threshold for detecting objects that are to be masked in the video stream captured by the camera.

As lowering the threshold for detecting objects that are to be masked in the video stream captured by the camera will increase the sensitivity in all areas of the field of view of the camera, the obtained information may further indicate a subarea of the field of view of the camera in which the object is expected to first appear. This information may be obtained based on prior knowledge of where objects will first appear after being detected by the further device. For example, if the further device is located along a road or a corridor before the camera, an object detected by the further device will appear in a subarea of the camera including a portion of the road or corridor closest to the field of view of the further device. The threshold is then reduced only in the indicated subarea. In all other areas of the field of view of the camera the threshold is not reduced. This will increase the sensitivity of the detection only in the subarea of the image where the object is expected to first appear and hence reduce the risk of false detection and masking of objects in other areas of the field of view. Additionally, or alternatively, the threshold may instead be reduced in an area along a periphery of the field of view. This will achieve a similar effect since an object approaching the field of view of the camera will first appear somewhere along the periphery.

The information that the object is approaching the field of view of the camera is obtained in the camera before the object appears in the field of view of the camera.

The obtained information may further indicate at which point in time the object will occur in the field of view of the camera. The threshold is then reduced starting from the indicated point in time. This will increase the sensitivity of the detection starting from the indicated point in time and hence reduce the risk of false detection and masking of objects before the indicated point in time.

The above-mentioned optional additional features of the camera 100 described in relation to FIG. 1, when applicable, apply also to the alternative method described in relation to Figure.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method for masking a detected object in a video stream captured by a camera, wherein the camera is arranged in a camera system including the camera and at least a further device, wherein a location and field of view is known for the further device and a location and a field of view is known for the camera, and wherein the field of view of the further device and the field of view of the camera are non-overlapping, the method comprising:

obtaining, in the camera, information indicating that an object is approaching the field of view of the camera, wherein the obtained information is determined from information from the further device indicating a location and a direction of movement of the object and the known locations and fields of view of the camera and the further device;

in response to the obtained information, reducing a threshold on a confidence level over which an object is determined to belong to an object class which is to be masked in the video stream;

detecting an object and determining that the object belongs to the object class that is to be masked in the video stream in response to a confidence level of the object belonging to the object class that is to be masked being over the reduced threshold; and inserting masking of the detected object in the video stream, wherein the masking is such that the object can no longer be identified after masking.

2. The method according to claim 1, wherein the obtained information further indicates a subarea of the field of view of the camera in which the object is expected to first appear, and wherein, in the act of reducing, the threshold is reduced only in the indicated subarea.

3. The method according to claim 1, wherein the obtained information further indicates at which point in time the object will first appear in the field of view of the camera, and wherein the threshold is reduced starting from the indicated point in time.

4. The method according to claim 1, wherein the obtained information from the further device further indicates that the object is masked by the further device.

5. The method according to claim 1, wherein the obtained information from the further device further indicates an object class of the object.

6. The method according to claim 5, wherein the obtained information from the further device further indicates a confidence in relation to the object class.

7. The method according to claim 1, wherein, in the act of reducing, the threshold is reduced in an area along a periphery of the field of view.

8. The method according to claim 1, wherein the further device is one of:

a further camera,
an IR camera,
a thermal camera,
a radar,
a sonar, and
a lidar.

9. The method according claim 1, further comprising:

after detecting the object in the camera field of view, increasing the threshold; and on condition that the object is detected and determined to belong to the object class using the increased threshold: maintaining masking of the detected object in the video stream;

on condition that the object is not detected or not determined to the object class using the increased threshold: discontinuing masking of the detected object in the video stream.

10. The method according to claim 9, wherein the act of increasing the threshold is performed a predetermined time after detecting the object.

11. A non-transitory computer-readable storage medium having stored thereon instructions for implementing the method according to claim 1 when executed in a camera having a processor.

12. A camera for masking a detected object in a video stream captured by the camera, the camera comprising:

circuitry configured to execute, when the camera is arranged in a camera system including the camera and at least a further device, wherein a location and field of view is known for the further device and a location and a field of view is known for the camera, and wherein the field of view of the further device and the field of view of the camera are non-overlapping;

an obtaining function configured to obtain information indicating that an object is approaching the field of view of the camera, wherein the obtained information is determined from information from the further device indicating a location and a direction of movement of the object and the known locations and fields of view of the camera and the further device;

a reducing function configured to, in response to the obtained information, reduce a threshold on a confidence level over which an object is determined to belong to an object class which is to be masked in the video stream;

a detecting function configured to detect an object and determining that the object belongs to the object class that is to be masked in the video stream in response to a confidence level of the object belonging to the object class that is to be masked being over the reduced threshold; and an inserting function configured to insert masking of the detected object in the video stream, wherein the masking is such that the object can no longer be identified after masking.

* * * * *